United States Patent
Kaukeinen

[11] 3,900,546
[45] Aug. 19, 1975

[54] FILTERING EXTRUSION BATCH MATERIAL

[75] Inventor: Ralph M. Kaukeinen, Middlebury Center, Pa.

[73] Assignee: Corning Glass Works, Corning, N.Y.

[22] Filed: Sept. 18, 1973

[21] Appl. No.: 398,380

[52] U.S. Cl. ......... 264/102; 264/209; 264/DIG. 78; 425/198
[51] Int. Cl. ............................................. B28c 3/00
[58] Field of Search ............ 264/102, 209, DIG. 78; 425/198

[56] References Cited
UNITED STATES PATENTS

| | | | |
|---|---|---|---|
| 3,032,822 | 5/1962 | Maddock | 264/176 R |
| 3,390,216 | 6/1968 | Umeya et al. | 264/102 |
| 3,406,435 | 10/1968 | Dietzsch | 425/198 |
| 3,567,813 | 3/1971 | Keane et al. | 264/102 |
| 3,790,654 | 2/1974 | Bagley | 264/56 |

*Primary Examiner*—Donald E. Czaja
*Assistant Examiner*—H. H. Fletcher
*Attorney, Agent, or Firm*—Burton R. Turner; Clarence R. Patty, Jr.

[57] ABSTRACT

Plastically moldable ceramic batch material, which may be flowably extruded under pressure into a self-supporting article of desired shape and configuration, is passed through a wire mesh sieve and subjected to a scalping operation at least once to further homogenize the batch and remove coarse and foreign particles therefrom, after the batch material has been thoroughly mulled but prior to being extruded through the article forming die.

2 Claims, 2 Drawing Figures

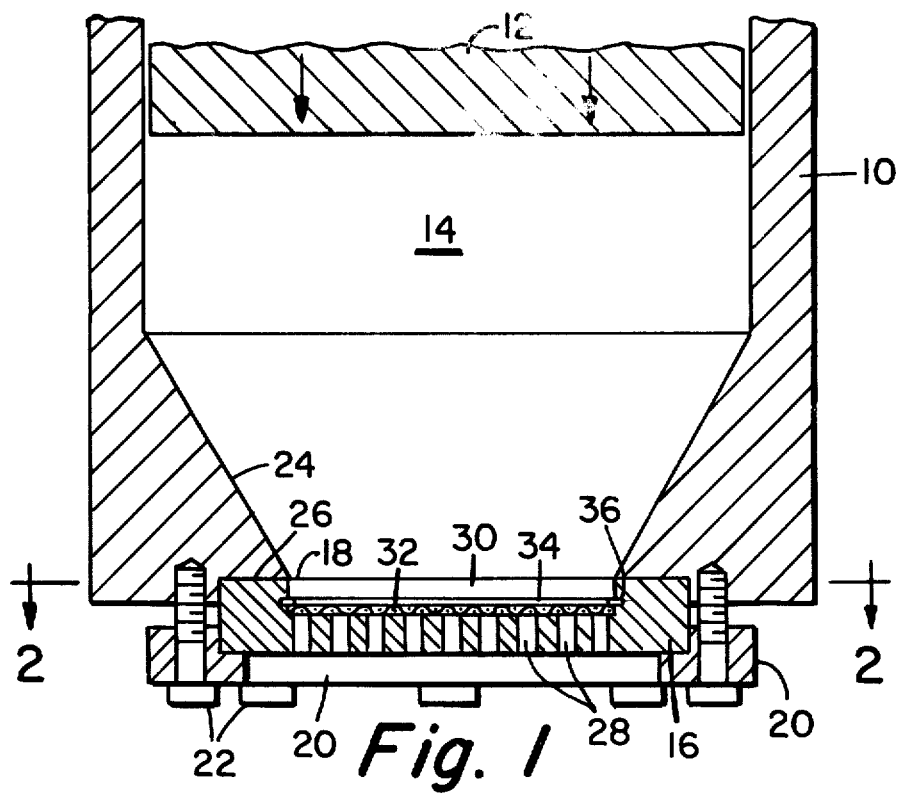
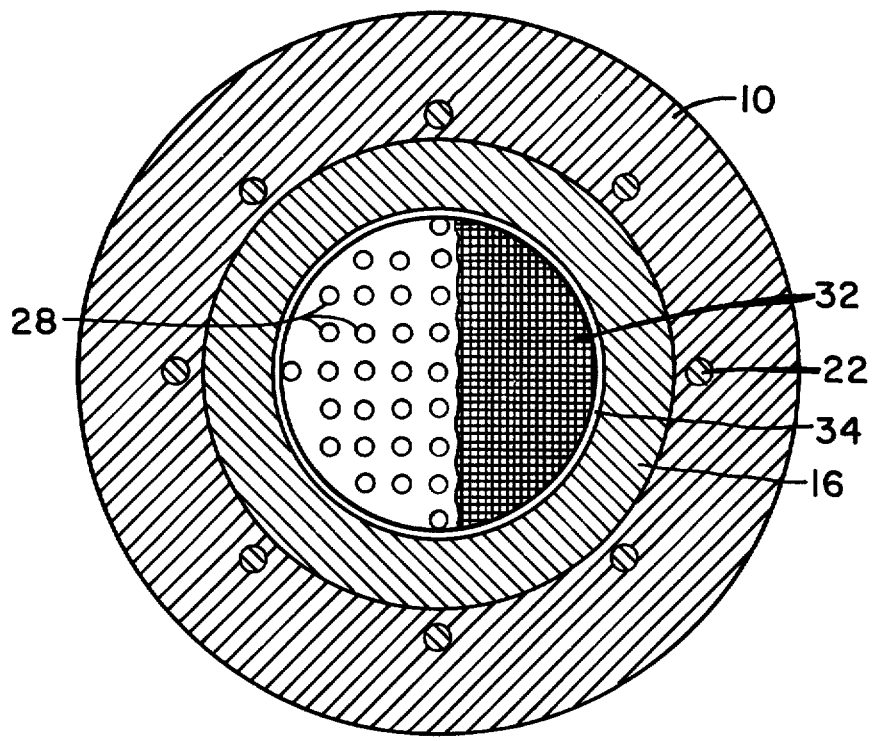

FILTERING EXTRUSION BATCH MATERIAL

BACKGROUND OF THE INVENTION

The present invention pertains to the art of manufacturing extrudable articles, and particularly thin-walled honeycomb structures from extrudable ceramic batches which have the property of being able to flow or plastically deform under pressure during extrusion, while being able to maintain their as-extruded form under ambient conditions after being relieved of the high extrusion force. More particularly, the present invention relates to an improved method of conditioning or refining extrudable ceramic batch material by purifying and homogenizing the same while being subjected to extrusion pressures during an extrusion operation, but prior to such material being extruded through a finished article forming die.

In the extrusion forming of thin-walled honeycomb structures from ceramic batch material, it is necessary to force the batch through a gridwork of discharge slots or passages having a cross sectional width of about .010 inch and a depth of approximately .150 inch. Accordingly, in order to avoid the clogging or plugging of such slots, which would result in missing cell walls within the resulting honeycomb structure, it is necessary that the batch material be purified and homogenized prior to being forced through such die so as to prevent coarse or foreign material in the batch from clogging the honeycomb discharge slots.

In the past it has been common practice to pre-extrude mulled ceramic batch material prior to the final extrusion process in order to further homogenize and de-air the batch. However, despite the thorough mulling and mixing of the ceramic batch ingredients and the pre-extrusion of such batch material through a pre-extrusion or "noodle" die to form strands or "noodles" of batch material, it was found that when such material was forced through a final extrusion die for forming honeycomb structures, various slots in the die become plugged by the material thus resulting in a defective extrusion having missing walls or open cells.

The present invention overcomes the problems encountered in the prior art relative to the plugging of passages in extrusion dies by coarse or foreign material within the prepared extrusion batch, without inducing undesirable secondary effects such as batch discontinuity. To accomplish this end, after the ceramic batch material has been thoroughly mulled and mixed, it is subjected to a preliminary or pre-extrusion operation prior to being extruded through a final article-forming die, and while under high extrusion pressures during such pre-extrusion, the batch material is passed through a fine wire mesh screen and scalped of contaminants such as coarse or foreign particles in the batch which would tend to plug the passages in the final article-forming extrusion die.

SUMMARY OF THE INVENTION

In its very simplest form, the present invention is directed to an improved method of purifying and homogenizing ceramic batch material to be utilized for forming extruded ceramic honeycomb structures, by removing undesirable particulate matter therefrom while such material is under the high extrusion pressures of a pre-extrusion operation, but prior to being extruded through a final article-forming extrusion die. Whereas the prior art concepts suggested the thorough mixing of extrudable batch materials and the pre-extrusion of such batch to de-air and improve the homogeneity thereof, these known procedures failed to remove the undesirable particulate matter such as coarse particles or foreign particles from the batch material, which particles could result in die-plugging problems when extruding thin-walled honeycomb articles. Accordingly, I have found that the purity and homogeneity of the batch material can be materially improved during a pre-extrusion process by forcing pre-mulled and mixed ceramic batch material through a sieve or screen to scalp or otherwise remove contaminant materials from the batch, such as coarse or foreign particules, while simultaneously enhancing the homogeneity of such batch by momentarily splitting the same into very fine strands which immediately reunite into a composite or compact batch prior to passing through an adjacent downstream extrusion die. The scalping of the batch material during such preliminary extrusion provides an improved batch which facilitates the subsequent final extrusion of thin-walled honeycomb structures, while virtually eliminating the plugging of the extrusion die which was otherwise occasioned without the scalping operation.

It thus has been an object of the present invention to eliminate the problem of plugged extrusion dies for forming thin-walled honeycomb articles due to contaminating particles within ceramic batch material clogging various passages of such dies, by scalping the contaminating particles from the batch material during a pre-extrusion operation, and prior to such batch being extruded through the final honeycomb extrusion die.

BRIEF DESCRIPTION OF THE DRAWINGS

FIG. 1 is a somewhat schematic elevational view in section of a pre-extrusion die assembly embodying the present invention.

FIG. 2 is a sectional plan view taken along line 2—2 of FIG. 1, with a portion of the scalping sieve removed to show the pre-extrusion die there below.

DESCRIPTION OF THE PREFERRED EMBODIMENTS

Referring now to the drawings, an extrusion cylinder 10 is shown having a plunger 12 movable within an extrusion chamber 14. A pre-extrusion die 16 is secured to the discharge outlet end 18 of the chamber 14 by means of a retainer ring 20 secured to cylinder 10 by attachment bolts 22. Although forming no part of the present invention, the extrusion chamber 14 is shown having a transition zone 24 provided with wall portions which converge inwardly from the main extrusion chamber diameter toward the discharge outlet end 18 so as to facilitate the positionment of a die 16 having a smaller cross sectional area than that of the main extrusion chamber. The transition zone 14 may, if desired, be in the form of a removable insert positioned within or attached to the outlet end of the extrusion cylinder, when there is a need to reduce the effective diameter of the outlet end thereof. However, it will be apparent that if desired the transition zone may be eliminated and the discharge outlet 18 may be the same diameter as the main diameter of the extrusion chamber 14.

As shown, the outlet end of extrusion cylinder 10 may be provided with a die-positioning recess 26 for positioning and aligning die member 16 relative to the discharge outlet 18. The pre-extrusion die 16 has a plurality of cylindrical bores or passages 28 extending therethrough for forming strands or "noodles" of batch material which is subsequently re-extruded into a final article. In fact, the pre-extrusion die is also known in the trade as a "noodle" die or "spaghetti" die due to the noodle or spaghetti-like shape of the batch as it is discharged therefrom. A recess 30, formed in the entrance face of the die 16, is provided with a sieve or screen 32, which is shown as being retained in place by a snap ring 34 which fits within a peripheral groove 36 and overlies edge portions of the sieve 32. The sieve 32 is in engagement with and lies across the inlet face of pre-extrusion die 16.

Since the bores or passages 28 extending through pre-extrusion die 16 may be in the order of about ⅛ inch diameter, the screen material must be strong enough to span such openings and withstand the high extrusion pressures required to force the stiff ceramic batch material therethrough. One such material which may be utilized is a plain weave 60 mesh wire cloth of about .0075 inch diameter Type 304 stainless steel wire. Such a sieve has normal 0.009 inch × 0.009 inch openings which are adequate for scalping contaminants from the batch material so that there are no particles remaining in the batch which would plug-up the fine extrusion slots in a final honeycomb extrusion die, which slots may have a width of only about .010 inch.

Although by no means limiting in nature, the following specific example illustrates one embodiment of the present invention. A ceramic batch material comprising about 58 parts by weight of pulverized EPK Florida Kaolin, obtainable from Whittaker, Clark and Daniels of New York, N.Y., about 20 parts by weight of Texas white talc No. 2619, obtainable from Hammel & Gillepsie, Inc. of White Plainfield, N.J., and about 22 parts by weight of T-61 alumina produced by Aluminum Corp. of America were thoroughly mixed in a dry blender and then put into a wetpan Muller mixer where about 28 parts by weight of water was added together with suitable extruding aids for bonding and plasticizing, such as methyl cellulose, whereupon the batch material was thoroughly mulled and mixed.

The wet batch in the form of a stiff clay was then put into the cylinder of an extrusion press, having a pre-extrusion die secured to the outlet end. The die was provided with a plurality of ⅛ inch diameter bores extending therethrough evenly spaced across its operating face exposed to the extrusion chamber. A wire cloth sieve having a plain weave 60 mesh of .0075 inch diameter type 304 stainless steel wire was positioned over the inlet end of the extrusion die. A snap ring held the sieve in position adjacent the die face. About 500 pounds of such batch material was extruded at a pressure of about 1,900 PSI through the sieve and pre-extrusion die to not only scalp the batch material of undesirable contaminants such as coarse batch particles and foreign particles, but also serve to plasticize and de-air the wet ceramic batch material.

Upon removal of the sieve from the inlet face of the die after completion of the extrusion process, it was found that the sieve not only contained coarse particles of clay and silica, but also foreign bits of material such as steel and rubber. Further, upon utilizing such scalped batch material in a final extrusion process wherein such material was subsequently extruded through a final extrusion die having a gridwork of narrow discharge slots to form honeycomb ceramic articles having thin walls of approximately .010 inch, it was found that the resulting products were of improved quality and did not suffer from incomplete wall formation due to plugged or clogged passages in the final extrusion die.

Although I have disclosed the now preferred embodiments of my invention, it will be apparent to those skilled in the art that various changes and modifications may be made thereto, such as by changing the sieve material, diameter or mesh, however such modifications would not depart from the spirit and scope of the invention as defined in the appended claims.

I claim:

1. In the method of forming honeycomb articles from extruded ceramic batch material wherein ceramic batch material is extruded under pressure through a final extrusion die having a gridwork of narrow discharge slots to form thin-walled honeycomb ceramic articles, the improvement comprising a method of removing contaminants from the extrudable ceramic batch material prior to such material being extruded through the final extrusion die so as to avoid the clogging of the discharge slots thereof with such contaminants which comprises, initially blending ceramic batch material ingredients in a dry state, adding water to said ingredients and further mixing the batch material, subjecting said mixed batch material to a pressing force providing an extrusion pressure for extruding the same through a pre-extrusion die, and while subjected to said extrusion pressure and prior to passing through said pre-extrusion die, scalping said batch material of contaminant particles to thereby produce batch material of improved purity and homogeneity, immediately passing said scalped batch material through a pre-extrusion die in order to further plasticize and de-air the ceramic batch material, removing said ceramic batch material from said pre-extrusion die, and then subsequently press extruding said scalped and de-aired ceramic batch material through a separate final extrusion die unconnected to said pre-extrusion die and having a gridwork of narrow discharge slots to form thin-walled honeycomb ceramic articles.

2. In the method of forming honeycomb articles from extruded ceramic batch material as defined in claim 1 including the steps of forming fine strands of ceramic batch material as the material is passed through a scalping sieve, immediately reuniting said fine strands into a composite batch after passing through said sieve, then forming spaghetti-like strands of batch material by passing the same through the pre-extrusion die, collecting said strands externally of said die, and then in a separate operation feeding said strands through said final extrusion die separated from said pre-extrusion die.

* * * * *